OR    3,822,931

United Stat
Matsubara

[11] 3,822,931
[45] July 9, 1974

[54] MICROSCOPE OBJECTIVE
[75] Inventor: Masaki Matsubara, Tokyo, Japan
[73] Assignee: Olympus Optical Co., Ltd., Tokyo-to, Japan
[22] Filed: May 23, 1973
[21] Appl. No.: 363,277

[30] Foreign Application Priority Data
May 27, 1972  Japan.................... 47-52799

[52] U.S. Cl.......... 350/215, 350/175 ML, 350/176, 350/177
[51] Int. Cl..................... G02b 9/62, G02b 21/02
[58] Field of Search ..... 350/215, 175 ML, 176, 177

[56] References Cited
UNITED STATES PATENTS
3,661,446  5/1972  Mori et al...................... 350/177 X FOREIGN PATENTS OR APPLICATIONS
27,850  9/1970  Japan.......................... 350/175 ML Primary Examiner—John K. Corbin
Attorney, Agent, or Firm—Cushman, Darby & Cushman

[57] ABSTRACT

The present invention relates to microscope objectives and more particularly, to a high-magnification microscope objective with a magnification 100 and numerical aperture 0.9. Besides, for the microscope objective according to the present invention, aberrations, especially spherical and chromatic aberrations are favourably corrected by selecting the sum of powers at all lens surfaces in the lens system, i.e., $\Sigma(n_{i+1} - n_i)/r_i$, as a positive value with a small absolute value.

1 Claim, 4 Drawing Figures

FIG. I
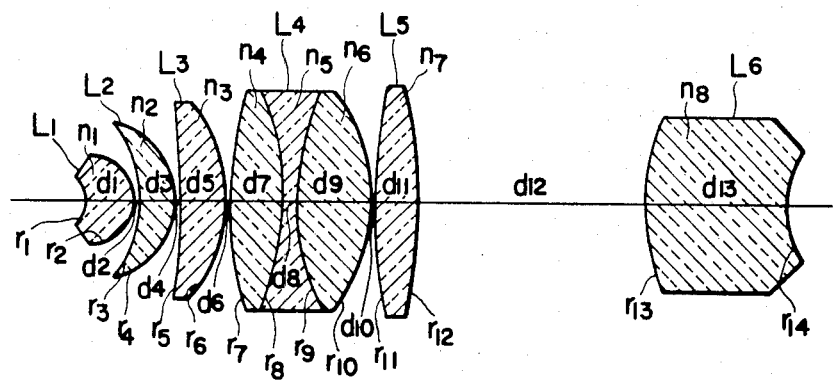
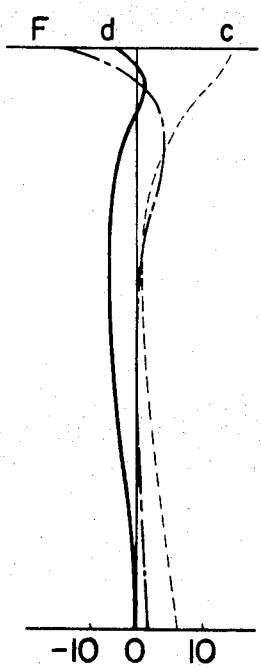
FIG. 2a
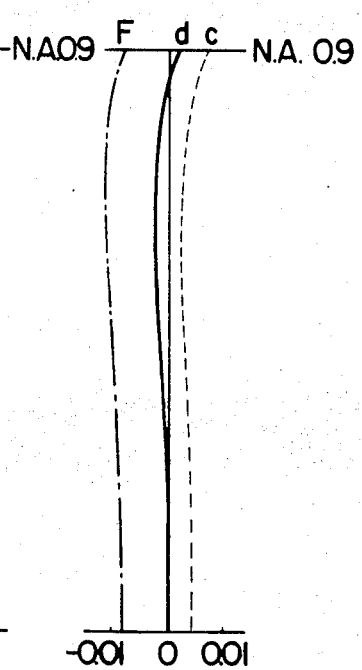
FIG. 2b
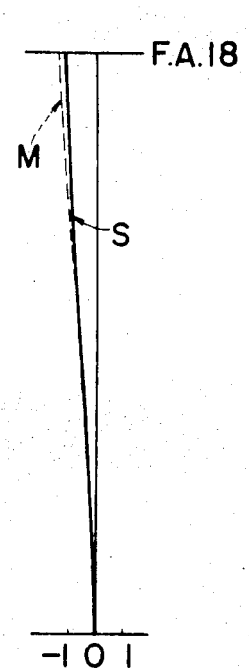
FIG. 2c

MICROSCOPE OBJECTIVE

BACKGROUND OF THE INVENTION

1. Field of the Invention

The present invention relates to a microscope objective with a flat field, high magnification and large numerical aperture.

2. Description of the Prior Art

Though a microscope objective with the magnification 80 is already provided, design of a microscope objective of still higher magnification has been looked for. Even if, however, the magnification of the conventional objective with the magnification 80 is simply increased by proportionally enlarging as it is, spherical aberration deteriorates because of the extremely high magnification and, moreover, chromatic aberration also becomes very unfavourable. Therefore, such objective cannot be put to practical use. To provide a high-magnification microscope objective with the high magnification of 100, adequate improvement is essential.

SUMMARY OF THE INVENTION

It is, therefore, a principal object of the present invention to provide a microscope objective with a magnification 100 and numerical aperture 0.9 for which aberrations, especially spherical and chromatic aberrations, are quite favourably corrected.

BRIEF DESCRIPTION OF THE DRAWINGS

FIG. 1 shows a sectional view illustrating the composition of the embodiment of the microscope objective according to the present invention; and FIG. 2A, FIG. 2B, and FIG. 2C show graphs illustrating aberration curves of the embodiment of the present invention.

DESCRIPTION OF THE PREFERRED EMBODIMENT

As shown in FIG. 1, the microscope objective according to the present invention comprises six lenses or components. The first lens $L_1$, second lens $L_2$ and third lens $L_3$ are positive meniscus lenses with their concave surfaces respectively positioned on the object side. The fourth lens component $L_4$ is a cemented positive triplet, the fifth lens $L_5$ is a biconvex lens and the sixth lens $L_6$ is a negative meniscus lens arranged leaving a large airspace from said fifth lens $L_5$. Besides, the microscope objective according to the present invention has numerical data as given below.

| $f=2.09$ | | NA=0.9 | | $\beta=-100.0$ |
|---|---|---|---|---|
| $r_1=-1.262$ | | | | |
| | $d_1=1.89$ | | $n_1=1.516$ | $\nu_1=64.2$ |
| $r_2=-1.608$ | | | | |
| | $d_2=0.07$ | | | |
| $r_3=-4.661$ | | | | |
| | $d_3=1.28$ | | $n_2=1.486$ | $\nu_2=81.8$ |
| $r_4=-2.978$ | | | | |
| | $d_4=0.10$ | | | |
| $r_5=-24.870$ | | | | |
| | $d_5=1.60$ | | $n_3=1.434$ | $\nu_3=95.2$ |
| $r_6=-5.670$ | | | | |
| | $d_6=0.12$ | | | |
| $r_7=14.054$ | | | | |
| | $d_7=1.93$ | | $n_4=1.434$ | $\nu_4=95.2$ |
| $r_8=-10.054$ | | | | |
| | $d_8=0.64$ | | $n_5=1.834$ | $\nu_5=37.2$ |
| $r_9=9.253$ | | | | |
| | $d_9=2.35$ | | $n_6=1.434$ | $\nu_6=95.2$ |
| $r_{10}=-6.560$ | | | | |

-Continued

| $f=2.09$ | | NA=0.9 | | $\beta=-100.0$ |
|---|---|---|---|---|
| $r_{11}=19.900$ | $d_{10}=0.12$ | | | |
| | $d_{11}=1.65$ | | $n_7=1.434$ | $\nu_7=95.2$ |
| $r_{12}=-19.900$ | | | | |
| | $d_{12}=7.96$ | | | |
| $r_{13}=8.619$ | | | | |
| | $d_{13}=5.05$ | | $n_8=1.486$ | $\nu_8=81.8$ |
| $r_{14}=3.802$ | | | | |
| W.D.=0.492    Petzval's sum=0.086 | | | | |
| $\Sigma(n_{i+1}-n_i)/r_i=0.01611$ | | | | |

In the above numerical data, reference symbol $f$ represents the total focal length of the lens system as a whole, reference symbol $\beta$ represents the magnification of the lens system as a whole, reference symbols $r_1$ through $r_{14}$ represent radii of curvature of respective lens surfaces, reference symbols $d_1$ through $d_{13}$ represent thicknesses of respective lenses and spaces between lenses, reference symbols $n_1$ through $n_8$ represent refractive indexes of respective lenses for the d-line, reference symbols $\nu_1$ through $\nu_8$ represent Abbe's numbers of respective lenses for the d-line, and reference symbol W.D. represents the work distance.

For the microscope objective according to the present invention having numerical data as given in the above table, the algebraic sum of powers of respective lens surface, i.e., $\Sigma(n_{i+1}-n_i)/r_i$, is a positive value with a small absolute value and, therefore, spherical aberration of this objective is favourably corrected. Besides, Petzval's sum is made small by making powers of respective lens surfaces as positive values. The airspace $d_{12}$ between the fifth lens $L_5$ and the sixth lens $L_6$ is made larger than the sum of the thickness $d_1$ of the first lens $L_1$ and thickness $d_{13}$ of the sixth lens $L_6$, i.e., $d_1 + d_{13}$. By these arrangements, curvature of the field is satisfactorily corrected and the field is made flat. Furthermore, chromatic aberration is favourably corrected by making both Abbe's number $\nu_2$ of the second lens $L_2$ and Abbe's number $\nu_8$ of the sixth lens $L_6$ as 81.8. At the same time, over-correction of lateral chromatic aberration, which occurs by the fact that a material of Abbe's number $\nu_2 = 81.8$ is used for the second lens $L_2$, is favourably corrected by using the material of Abbe's number $\nu_8 = 81.8$ also for the sixth lens $L_6$.

Besides, chromatic aberration and other aberrations are favourably balanced by using a cemented positive triplet as the fourth lens component $L_4$ and by making Abbe's number $\nu_5$ of the middle lens of said cemented lens component as 37.5.

As explained in the above, the microscope objective of the present invention has a high magnification of 100 and large numerical aperture, and aberrations of said microscope objective, expecially, spherical and chromatic aberrations are quite favourably corrected as it is evident also from aberration curves shown in FIG. 2A, FIG. 2B, and FIG. 2C.

I claim:

1. A microscope objective comprising first, second, third, fourth, fifth and sixth lens components, wherein said first said second and said third are positive meniscus lenses having their concave surfaces respectively positioned on the object side, said fourth is a cemented positive triplet component, said fifth is a biconvex lens and said sixth is a negative meniscus lens arranged by leaving a large airspace from said fifth lens and having the convex surface positioned on the objective side, and said microscope objective having numerical data as given below:

$f = 2.09$

| | | | |
|---|---|---|---|
| $r_1 = -1.262$ | | | |
| | $d_1 = 1.89$ | $n_1 = 1.516$ | $\nu_1 = 64.2$ |
| $r_2 = -1.608$ | | | |
| | $d_2 = 0.07$ | | |
| $r_3 = -4.661$ | | | |
| | $d_3 = 1.28$ | $n_2 = 1.486$ | $\nu_2 = 81.8$ |
| $r_4 = -2.978$ | | | |
| | $d_4 = 0.10$ | | |
| $r_5 = -24.870$ | | | |
| | $d_5 = 1.60$ | $n_3 = 1.434$ | $\nu_3 = 95.2$ |
| $r_6 = -5.670$ | | | |
| | $d_6 = 0.12$ | | |
| $r_7 = 14.054$ | | | |
| | $d_7 = 1.93$ | $n_4 = 1.434$ | $\nu_4 = 95.2$ |
| $r_8 = -10.054$ | | | |
| | $d_8 = 0.64$ | $n_5 = 1.834$ | $\nu_5 = 37.2$ |
| $r_9 = 9.253$ | | | |
| | $d_9 = 2.35$ | $n_6 = 1.434$ | $\nu_6 = 95.2$ |
| $r_{10} = -6.560$ | | | |
| | $d_{10} = 0.12$ | | |
| $r_{11} = 19.900$ | | | |
| | $d_{11} = 1.65$ | $n_7 = 1.434$ | $\nu_7 = 95.2$ |
| $r_{12} = -19.900$ | | | |
| | $d_{12} = 7.96$ | | |
| $r_{13} = 8.619$ | | | |
| | $d_{13} = 5.05$ | $n_8 = 1.486$ | $\nu_8 = 81.8$ |
| $r_{14} = 3.802$ | | | | where reference symbol $f$ represents the total focal length of the lens system as a whole, reference symbols $r_1$ through $r_{14}$ represent radii of curvature of respective lens surfaces, reference symbols $d_1$ through $d_{13}$ represent thicknesses of respective lenses and spaces between lenses, reference symbols $n_1$ through $n_8$ represent refractive indexes of respective lenses for the d-line and reference symbols $\nu_1$ through $\nu_8$ represent Abbe's numbers of respective lenses for the d-line.

\* \* \* \* \*